(12) United States Patent  (10) Patent No.: US 9,325,353 B2
Siomkos et al.  (45) Date of Patent: Apr. 26, 2016

(54) ARCHITECTURE FOR A RADIO FREQUENCY FRONT-END

(75) Inventors: John Robert Siomkos, Greensboro, NC (US); Jayanti Jaganatha Rao, Jamestown, NC (US); Christopher Truong Ngo, Queen Creek, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 197 days.

(21) Appl. No.: 13/611,620

(22) Filed: Sep. 12, 2012

(65) Prior Publication Data

US 2013/0072253 A1  Mar. 21, 2013

Related U.S. Application Data

(60) Provisional application No. 61/535,481, filed on Sep. 16, 2011.

(51) Int. Cl.
*H04B 1/38* (2015.01)
*H04B 1/00* (2006.01)

(52) U.S. Cl.
CPC .................................. *H04B 1/006* (2013.01)

(58) Field of Classification Search
CPC ............. H04B 1/06; H04B 1/38; H04B 1/401
USPC ................... 455/73, 83, 550.1, 552.1, 78
See application file for complete search history.

(56) References Cited

U.S. PATENT DOCUMENTS

| 6,411,176 | B1* | 6/2002 | Atokawa ............... H01P 1/2136 333/132 |
| 7,692,513 | B2* | 4/2010 | Yoshimoto ....................... 333/32 |
| 2006/0040628 | A1* | 2/2006 | Porret et al. ................ 455/234.1 |
| 2006/0128322 | A1* | 6/2006 | Igarashi et al. .................. 455/78 |
| 2006/0189286 | A1* | 8/2006 | Kyu et al. ....................... 455/144 |
| 2008/0142935 | A1* | 6/2008 | Montoriol et al. ............. 257/666 |
| 2009/0130993 | A1* | 5/2009 | Rofougaran ............. H04B 1/48 455/90.2 |
| 2011/0117862 | A1* | 5/2011 | Bagger et al. .................... 455/77 |
| 2011/0165848 | A1* | 7/2011 | Gorbachov et al. ............. 455/78 |

* cited by examiner

*Primary Examiner* — Tuan Pham
(74) *Attorney, Agent, or Firm* — Withrow & Terranova, P.L.L.C.

(57) ABSTRACT

An architecture for a radio frequency (RF) front-end is disclosed. The architecture for the RF front-end includes a circuit module that includes a plurality of dies partitioned on the circuit module. A plurality of filter banks with individual ones of the plurality of filter banks disposed on each of the plurality of circuit dies is also included. Further included is a plurality of switches having individual ones of the plurality of switches coupled to corresponding ones of the plurality of filter banks and in at least one embodiment a control system is configured to open and close selected ones of the plurality of switches.

22 Claims, 6 Drawing Sheets

ARCHITECTURE FOR A RADIO FREQUENCY FRONT-END

RELATED APPLICATIONS

This application claims the benefit of provisional patent application No. 61/535,481, filed Sep. 16, 2011, the disclosure of which is hereby incorporated herein by reference in its entirety.

FIELD OF THE DISCLOSURE

The present disclosure relates to multiband and sub-band wireless communication user equipment and in particular to radio frequency front-end (RFFE) architecture.

BACKGROUND

As the demand for increased data rates continues, a change from third generation (3G) to fourth generation (4G), long term evolution (LTE), specifications have returned for full bandwidth operation. In contrast to 3G wideband code division multiple access (WCDMA), 4G long term evolution (LTE) requires nearly band edge to band edge operation in both transmit and receive bands. The need comes as a result of the channel bandwidths for LTE. The channel bandwidths can change dynamically and can be as small as 1.4 MHz as opposed to the fixed 5 MHz channel bandwidths of WCDMA. As the channels shrink in size the channels at the edges of the bands become increasingly more dependent on a flatter response across the entire band. The amount of energy in the channels as the band edges are approached is higher and thus, the loss becomes more significant as channel spacing is reduced. It is especially difficult to obtain a flat response across the entire band for those bands with narrow separation between transmit (TX) and receive (RX) bands. As a result of this difficulty due to the close proximity between TX and RX bands, a high degree of TX to RX isolation for LTE is required where there is a tendency to roll filter responses off early to meet requirements detailed in rejection and isolation specifications.

Transceiver chip manufacturers for LTE applications have set expectations for performance that are beyond the capability of conventional Lithium Tantalate (LiTa) based surface acoustic wave (SAW) duplexer filters. LTE bands have proven to be relatively difficult for manufacturers of conventional LiTa SAW filters to maintain desired specifications. In particular, meeting requirements that will satisfy customers at the carrier level for the LTE band 2 and the LTE band 8 have proven to be extremely difficult. As a result of this problem, the third generation partnership project (3GPP) specifications have made some reluctant relaxations at the band edges. In efforts to maintain performance over the full band, some manufacturers have taken steps towards the use of more exotic technologies such as bulk acoustical wave (BAW) technology for LTE band 2. However, BAW technology has proven to be an expensive alternative to conventional SAW technology. For example, BAW filters are difficult to produce within manufacturing tolerances. As a result, lower yields of acceptable BAW filters are produced, which leads to higher costs. Attempts to meet LTE band 8 requirements have thus far lead to using bonded substrate technology, and various temperature compensating techniques. Such attempts and techniques have proven to be expensive and difficult to implement. What is needed is an architecture by which these types of very difficult bands, specifically LTE bands 2 and 8, are able to revert to using conventional LiTa SAW technology.

SUMMARY

The present disclosure provides an architecture for a radio frequency (RF) front-end that reduces RF front-end complexity to a relatively more manageable level and one that lends itself to being more easily manufactured and implemented at the handset and/or module level without the use of exotic types of technology such as BAW and temperature compensating schemes. The disclosed architecture for the radio frequency (RF) front-end provides a circuit module that includes a plurality of dies partitioned on the circuit module. A plurality of filter banks having individual ones of the plurality of filter banks disposed on each of the plurality of circuit dies is also included. Further included is a plurality of switches having individual ones of the plurality of switches coupled to corresponding ones of the plurality of filter banks. In at least one embodiment a control system is configured to open and close selected ones of the plurality of switches to route transmit (TX) and receive (RX) signals through filters comprising selected ones of the plurality of filter banks.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of an architecture for a radio frequency (RF) front-end of the present disclosure addresses multiple problems that are associated with achieving relatively high performance over full wireless communication bands such as LTE band 2 and LTE band 8. The embodiments of the disclosed architecture eliminate the need for technologies that are cost prohibitive and much harder to manufacture with consistent performance. Temperature compensation techniques have been attempted in various manners such as bonded wafers and temperature compensating coatings. Technologies such as Bulk acoustic Wave (BAW) are also used to achieve higher levels of performance. However, these technologies have proven to be difficult to manufacture and have thus far resulted in cost premiums due to the nature of manufacturing processes. Two widely used bands in the LTE specifications have proven to be exceptionally difficult to achieve performance in the areas of insertion loss, rejection and isolation between transmit and receive bands.

The architecture combines functional partitioning with sub-banding to achieve the performance advantage and adds switching which provides for a seamless integration into popular handset architectures. The difficulty of full band coverage is therefore reduced to a manageable technological solution. The partitioning of a TX and an RX die allows for increased physical isolation between the TX and RX functions. This, combined with the sub-banding of the TX filters and the RX filters, results in a technology that rivals the more exotic technologies yet brings a more simplistic approach to the larger problem. One embodiment of the disclosed architecture incorporates an LTE band 1 and an LTE band 2 TX die and an LTE band 1 and an LTE band 2 RX die, thus providing further efficiency of design by reducing the overall die area. The same rationale can be applied to the LTE band 5 and the LTE band 8 for the same reasons.

Traditionally, manufacturers have managed to achieve full receive coverage, but have failed to achieve a combined TX and RX performance for full band coverage without significant performance degradation. In contrast, the architecture maintains a consistent insertion loss across the LTE band 2 and the LTE band 8 TX and RX bands without the currently called for and reluctantly implemented band edge degradation. As a result, the architecture allows full band performance of the LTE band 2 RX and TX bands that extend from 1850 MHz through 1910 MHz for TX and 1930 MHz through 1990 MHz for RX.

Moreover, isolation between a TX signal and RX signal is greatly enhanced by the architecture and offers performance that is equivalent to that of more exotic technologies such as BAW, and temperature compensated schemes. Further still, band selection and sub-band selection are accomplished using an RF front-end (RFFE) interface such as the Mobile Industry Processor Interface (MIPI®). Another advantage is provided by controlling switches in communication with the RFFE interface and coupled to TX and RX ports. As a result, the architecture can be provided as a block that is substitutable into many popular wireless designs such as cellular LTE applications with minimal impact. In other words, the substitution of the architecture into traditional wireless designs is practically transparent to the end user.

The architecture utilizes a unique partitioning and sub partitioning of die and band pass filtering to accomplish a significant performance advantage for the LTE application. To utilize the architecture without burdening the end user by requiring unique hardware to be added, the architecture incorporates switching to make the result transparent to the end user. Switches are therefore used at the transmit inputs and divert the transmit signals to their respective filters, switches are used on the outputs of the receive filters in which the differential pairs are switched in pairs to the desired sub-bands.

The partitioning of filters into functionally separated die, the separate transmit and receive die each consisting of multiple band pass filters. Transmit filters are co-located on the same die and receive filters are co-located on the same die, combined with sub dividing the LTE band 2 and the LTE band 8 filters into multiple band pass filters.

Figure 1:
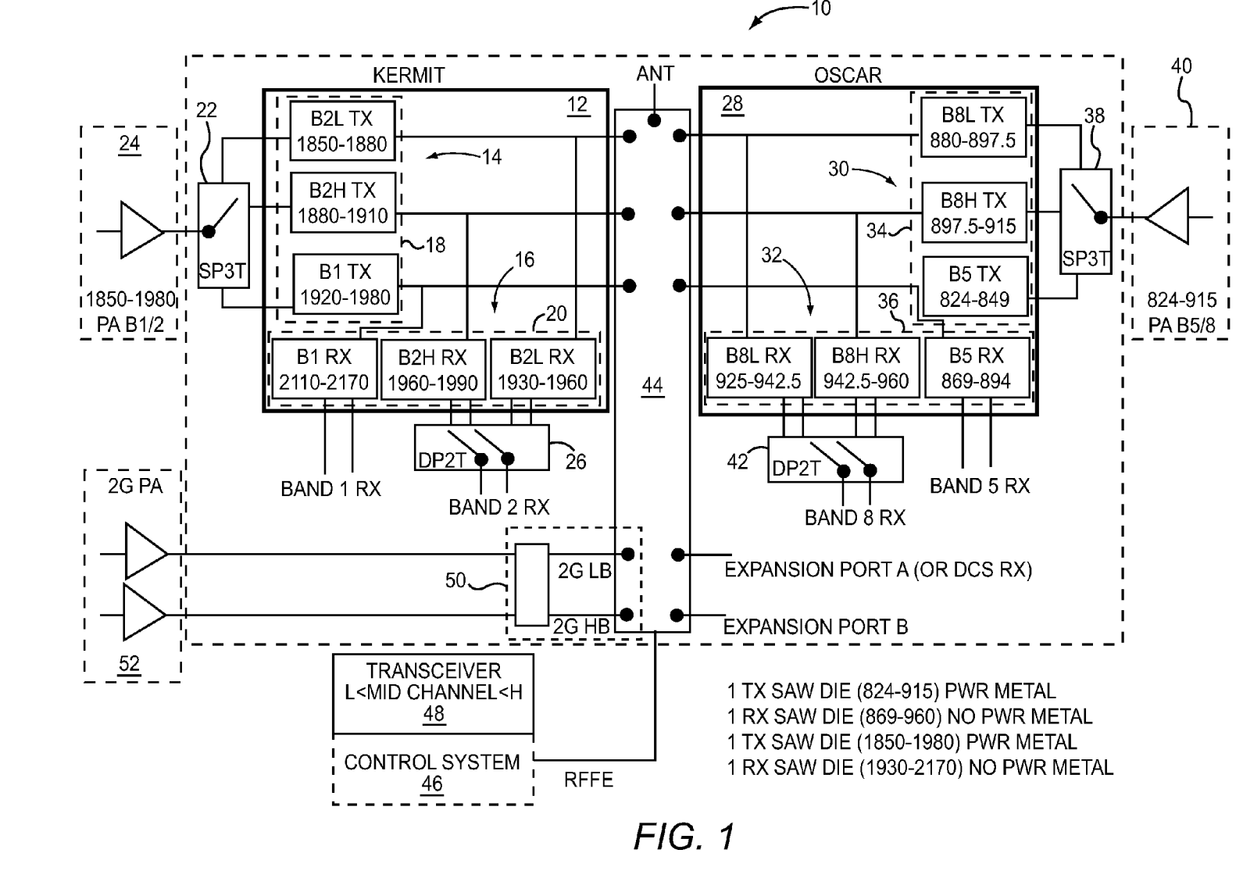
FIG. 1 is a schematic of an architecture that in accordance with the present disclosure addresses multiple problems that are associated with achieving relatively high performance over full wireless communication bands.

FIG. 1 is a schematic of an exemplary architecture 10 that includes a first circuit module 12 and a first plurality of circuit dies, which in this exemplary embodiment includes a first circuit die 14 and a second circuit die 16. The architecture 10 also includes a plurality of filter banks, which in this embodiment includes a first transmit (TX) filter bank 18 disposed on the first circuit die 14 and a first receive (RX) filter bank 20 disposed on the second circuit die 16.

The architecture 10 further includes a plurality of switches with individual ones of the plurality of switches being coupled to corresponding ones of the plurality of filter banks. In this exemplary case, the plurality of switches includes a first TX switch 22 coupled between a power amplifier 24 and the first TX filter bank 18. In this exemplary case, the first TX switch 22 is depicted as a single pole triple throw (SP3T) type switch for switching the output of the power amplifier 24 between three filters of the first TX filter bank 18. However, it is to be understood that the first TX switch can have fewer or additional switch throws depending on the number of and filters making up the first TX filter bank 18. The number of switch poles is typically equal to the number of power outputs to be routed through the first TX filter bank 18. A first RX switch 26 is coupled between an LTE band 2 receiver (not shown) and the first RX filter bank 20. In this case, the first RX switch 26 is a dual pole double throw (DP2T) type switch to switch RX differential pairs. It is to be understood that while an LTE band 1 receiver output is depicted as being directly coupled to one of the filters of the first RX filter bank 20, the LTE band 1 receiver output could be switched by adding more switch poles and switch throws to the first RX switch 26.

A second circuit module 28 and a first plurality of circuit dies, which in this exemplary embodiment includes a third circuit die 30 and a fourth circuit die 32. In this embodiment, the plurality of filters includes a second transmit (TX) filter bank 34 disposed on the third circuit die 30 and a second receive (RX) filter bank 36 disposed on the fourth circuit die 32.

The plurality of switches includes a second TX switch 38 coupled between a second power amplifier 40 and the second TX filter bank 34. In this exemplary case, the second TX switch 38 is depicted as a single pole triple throw (SP3T) type switch for switching the output of the second power amplifier 40 between three filters of the second TX filter bank 34. However, it is to be understood that the second TX switch 38 can have fewer or additional switch throws depending on the number of and filters making up the second TX filter bank 34. The number of switch poles is typically equal to the number of power outputs to be routed through the second TX filter bank 34. A second RX switch 42 is coupled between an LTE band 8 receiver (not shown) and the second RX filter bank 36. In this case, the second RX switch 46 is a dual pole double throw (DP2T) type switch to switch RX differential pairs. It is to be understood that while an LTE band 5 receiver output is depicted as being directly coupled to one of the filters of the second RX filter bank 36, the LTE band 5 receiver output could be switched by adding more switch poles and switch throws to the second RX switch 42.

An antenna switch 44 is coupled to the first plurality of filter banks and the second plurality of filter banks, which in this exemplary embodiment are made up of the first TX filter bank 18, the first RX filter bank 20, the second TX filter bank 34, and the second RX filter bank 36, respectively. A control system 46 that is typically associated with a transceiver 48 is configured to control the antenna switch 44. The control system 46 is also configured to open and close selected ones of the first plurality of switches and the second plurality of switches made up of the first TX switch 22, the first RX switch 26, the second TX switch 38, and the second RX switch 42, respectively. A harmonic filter 50 is coupled between a second generation (2 G) power amplifier 52 and the antenna switch 44. Moreover, in this exemplary embodiment an expansion port A and an expansion port B is made available via the antenna switch 44. The expansion ports A and B are usable for the reception of signals such as those used by the digital cellular system (DCS).

Figure 2:
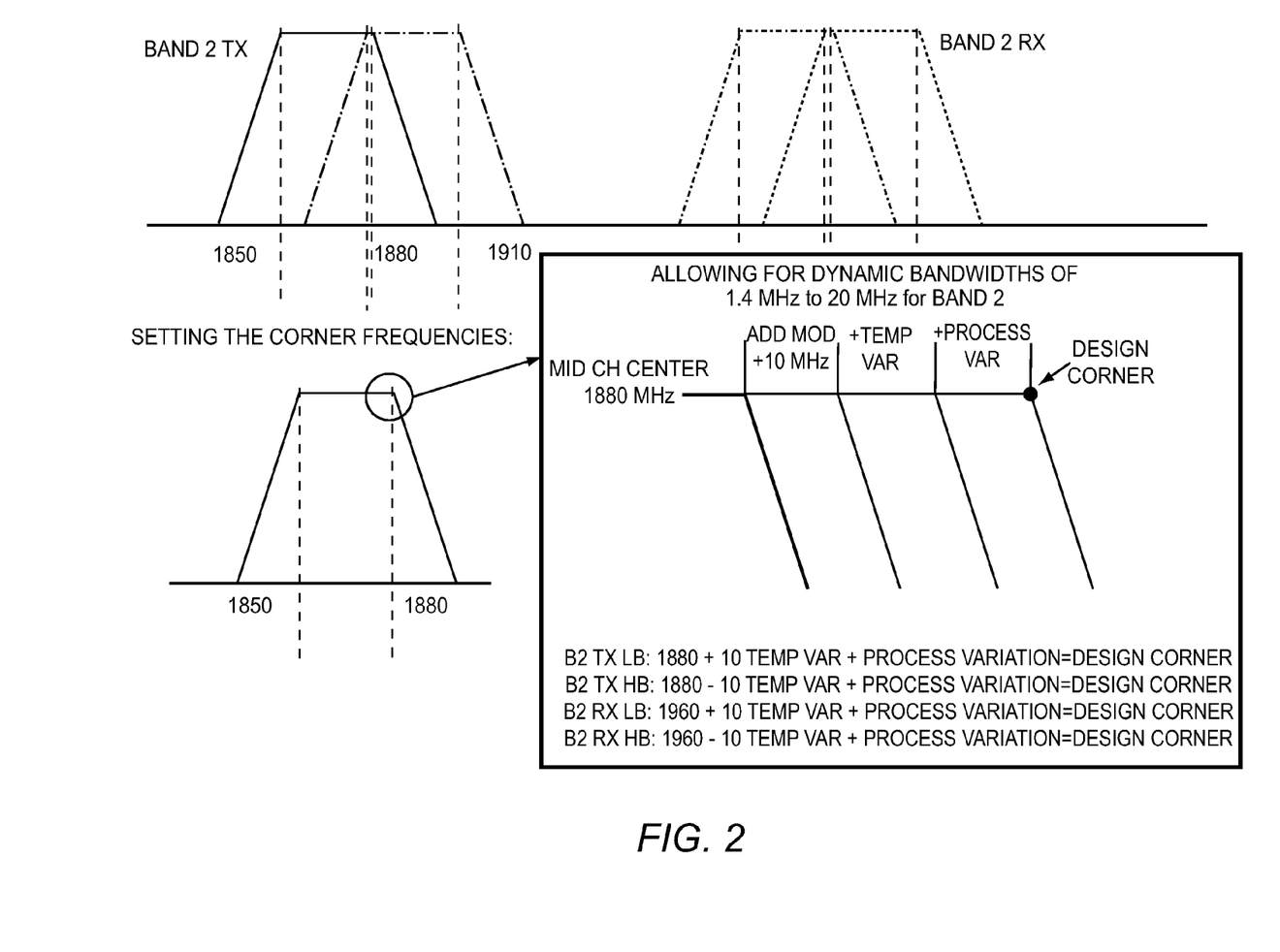
FIG. 2 is a spectrum diagram depicting a setting of corner frequencies for long term evolution (LTE) band 2 TX and LTE band 2 RX.

FIG. 2 is a spectrum diagram depicting a setting of corner frequencies for LTE band 2 TX and LTE band 2 RX. In particular, design corner frequency allowances for dynamic bandwidths of 1.4 MHz to 20 MHz for the LTE band 2 are shown in an inset that magnifies an exemplary corner frequency for a mid channel center of 1880 MHz. Also, in reference to the third generation partnership project standards (3GPP) LTE specification, the transmit and receive channel bandwidths are allowed to vary, a fixed minimum channel bandwidth of 1.4 MHz on the narrowest side and bounded according to band for the largest channel spacing. The channel bandwidths for LTE band 2 can vary from 1.4 MHz to 20 MHz and the channel bandwidths for LTE band 8 can vary from 1.4 MHz to 10 MHz.

Figure 3:
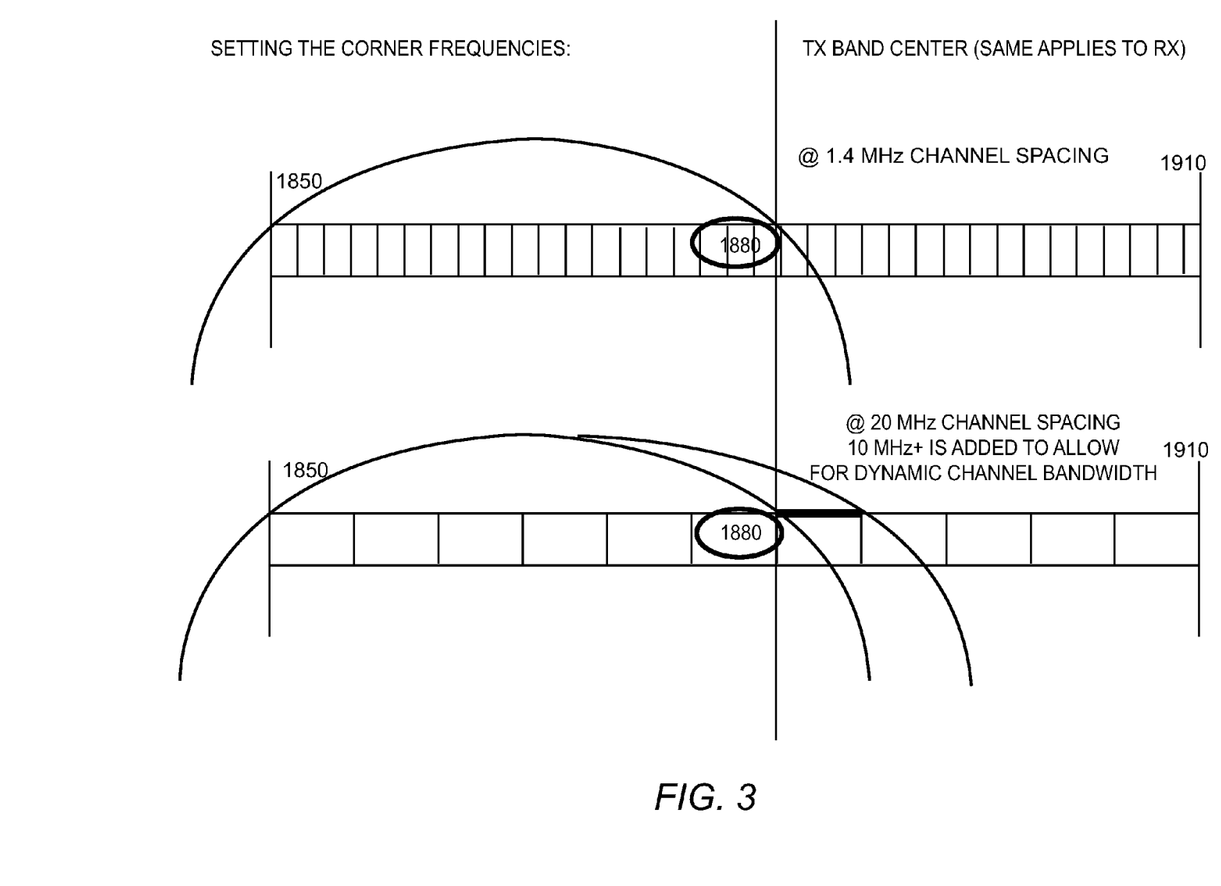
FIG. 3 is a spectrum diagram depicting the setting of corner frequencies to allow for LTE band 2 dynamic bandwidths from 1.4 MHz to 20 MHz.

FIG. 3 is a spectrum diagram depicting the setting of corner frequencies to allow for LTE band 2 dynamic bandwidths from 1.4 MHz to 20 MHz. Subdividing the band geometrically in halves as done in wideband code division multiple access WCDMA applications is no longer feasible without encountering performance degradation. The reason is that as the largest channel spacing is approached, the filter responses will roll off adding losses that translate into lost transmit power on the transmit side, and lost receive sensitivity on the receive side. At least one novel advantage offered is that the subdivision of the LTE band 2 and the LTE band 8 filters is offset from the center channel providing additional bandwidth overlap between upper band pass filters and lower band pass filters so that when the maximum channel spacing is approached there is sufficient bandwidth flatness so as to not encounter performance degradation in either the transmit or the receive filters. For LTE band 2 this amounts to providing an additional 10 MHz of useable bandwidth to the geometric center of the band and for LTE band 8 providing an additional 5 MHz of useable bandwidth to the geometric centers of the respective bands.

Figure 4:
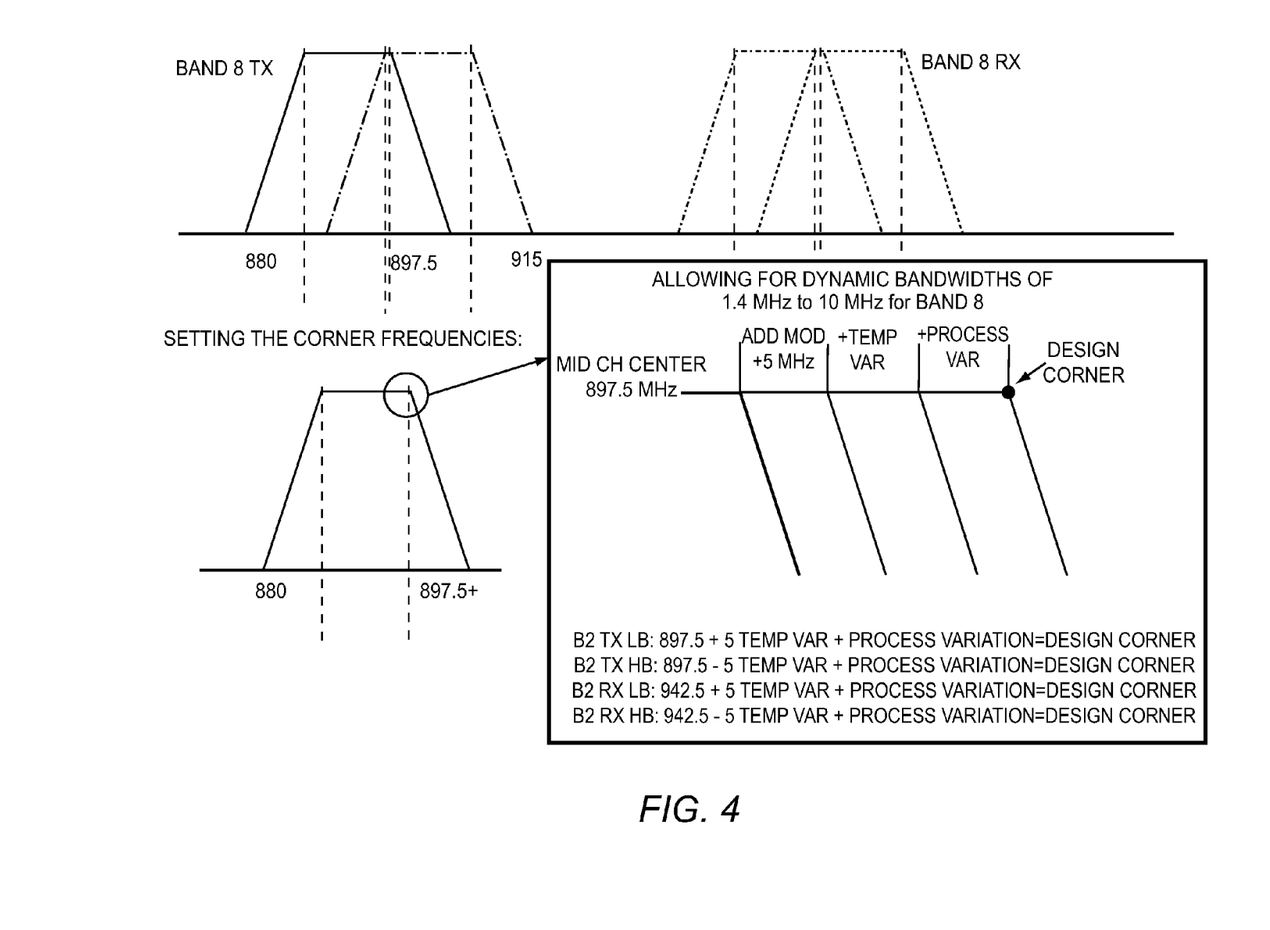
FIG. 4 is a spectrum diagram depicting a setting of corner frequencies for LTE band 8 TX and LTE band 8 RX.
Figure 5:
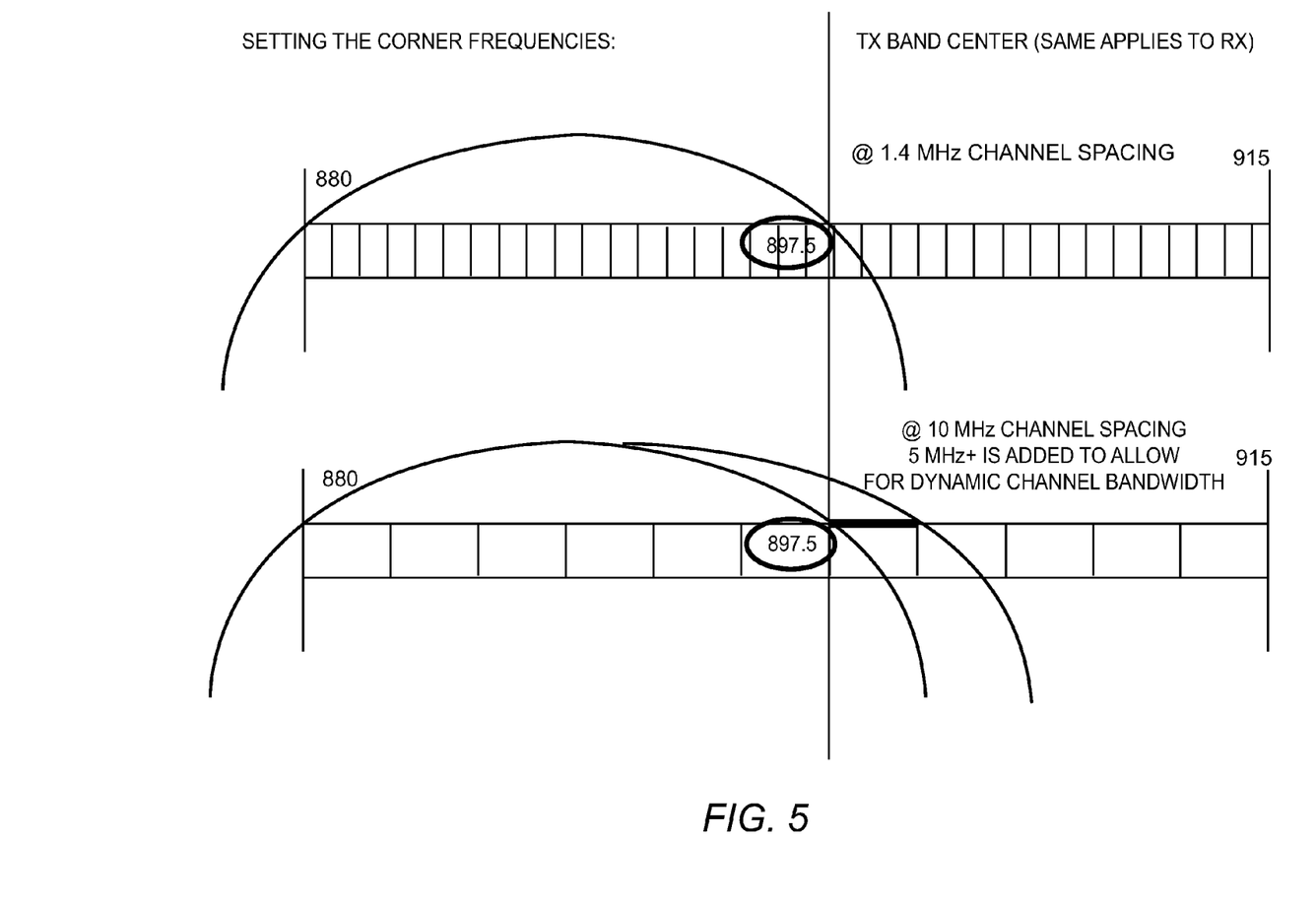
FIG. 5 is a spectrum diagram depicting a setting of corner frequencies for long term evolution (LTE) band 8 dynamic bandwidths from 1.4 MHz to 10 MHz.

FIG. 4 is a spectrum diagram depicting a setting of corner frequencies for LTE band 8 TX and LTE band 8 RX. In particular, design corner frequency allowances for dynamic bandwidths of 1.4 MHz to 10 MHz for the LTE band 8 are shown in an inset that magnifies an exemplary corner frequency for a mid channel center of 897.5 MHz. FIG. 5 is a spectrum diagram depicting the setting of corner frequencies to allow for LTE band 8 dynamic bandwidths from 1.4 MHz to 10 MHz. As stated above for FIG. 3, subdividing the band geometrically in halves as done in wideband code division multiple access WCDMA applications is no longer feasible without encountering performance degradation.

Figure 6:
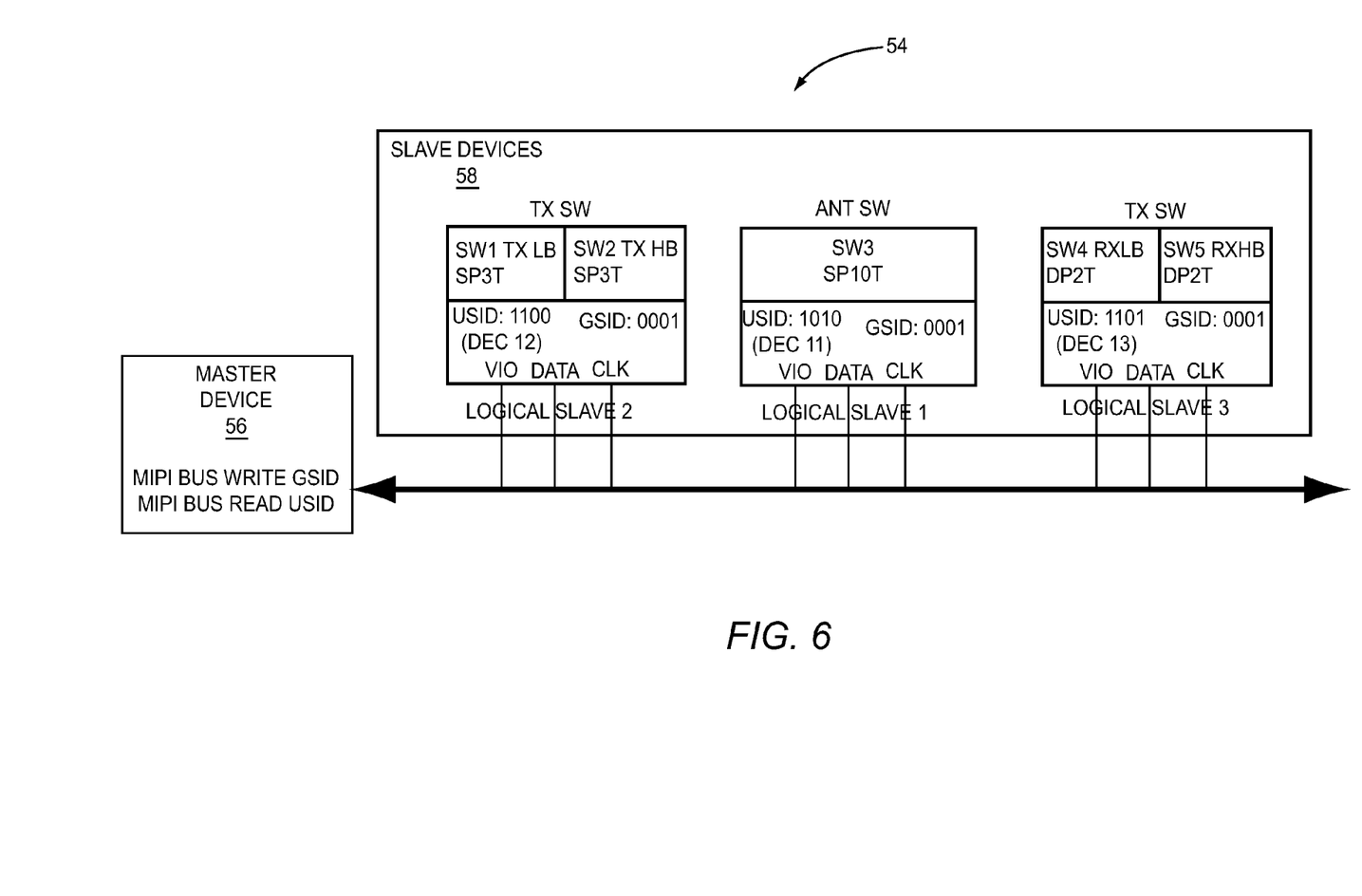
FIG. 6 is a block diagram of an exemplary radio frequency front-end (RFFE) interface and bus structure as employed in at least one embodiment of the present disclosure.

FIG. 6 is a block diagram of an exemplary RFFE interface and bus structure 54 as employed in at least one embodiment of the present disclosure. Bands and sub-bands are selected by using the information derived from over the air channel requests for specific frequency transmission and reception. The requested channel determines a band to be selected. This decision algorithm resides in a microprocessor of a mobile device (not shown) also known as the master device 56. A filter for a corresponding band is selectable through addressing the plurality of switches, which in this exemplary embodiment are slave MIPI RFFE devices 58. Information is transferred using the RFFE interface and bus structure 54 and individual filters of the plurality of filters are selected by sending a corresponding serial data pattern over the MIPI RFFE interface and bus structure 54 in accordance with a logic truth table, which in turn sets a switch position to a desired path.

Two methods of addressing are used in this exemplary embodiment. One known as the USID (reference MIPI specification, user ID) and the other known as the GSID (reference MIPI specification, group ID). Each of the slave switch devices 58 has an independent RFFE interface and each has unique programmable addresses for the USID and the GSID. For example, the RFFE protocol allows for broadcast messages to be sent over the RFFE interface. All slave switch devices 58 communicatively coupled to the RFFE interface bus can be communicated with simultaneously using the GSID for the USID portion of a command frame of a command sequence. Only write command sequences are sent using the GSID. Read command sequences using a GSID are ignored by slave devices. The slave devices of the embodiments of the present disclosure are switches. All switches are written to simultaneously using a GSID to remove any lag time between switches. Statuses of the switches are read using a USID that is unique for each switch.

In operation, there exist as many as three different switch operations to align the filter banks to the proper antenna path. A transmit input selector switch is used to divert the incoming transmit signal to the appropriate SAW bank filter. On the receive outputs switching is used to recombine the desired differential pair for the balanced outputs of the receive filter banks. The antenna switch is used to select the path from the antenna to the desired transmit/receive path. The timing of the switching can become an issue as path to path switching is requested. Sequentially programming each switch to its desired state can affect the transmit ramp mask if programming latency is too long. To avoid this potential problem and simplify the design the switching is done simultaneously in this design. Each of the switches has its own digital interface and is capable of being addressed through a group address or through a unique address. The group address is used to simultaneously set the desired state of each filter. This is accomplished by designing the switches to share a common truth table and performing a broadcast command over the RFFE bus. All devices matching the group identification will respond and be set simultaneously.

Those skilled in the art will recognize improvements and modifications to the preferred embodiments of the present disclosure. All such improvements and modifications are considered within the scope of the concepts disclosed herein and the claims that follow.

What is claimed is:

1. Architecture for a radio frequency front-end comprising:
   a first surface acoustic wave (SAW) band pass transmit filter with a first bandwidth corresponding to a first transmit band;
   a second SAW band pass transmit filter with a second bandwidth corresponding to a first transmit sub-band of a second transmit band;

a third SAW band pass transmit filter with a third bandwidth corresponding to a second transmit sub-band of the second transmit band, wherein the first transmit sub-band is adjacent to the second transmit sub-band and the first bandwidth is equal to a summation of the second bandwidth and the third bandwidth;

a fourth SAW band pass transmit filter with a seventh bandwidth corresponding to a third transmit band;

a fifth SAW band pass transmit filter with an eighth bandwidth corresponding to a third transmit sub-band of a fourth transmit band; and a sixth SAW band pass transmit filter with a ninth bandwidth corresponding to a fourth transmit sub-band of the fourth transmit band, wherein the third transmit sub-band is adjacent to the fourth transmit sub-band and 1.4 times the seventh bandwidth is equal to a summation of the eighth bandwidth and the ninth bandwidth.

2. The architecture for the radio frequency front-end of claim 1 wherein the second bandwidth is equal to the third bandwidth.

3. The architecture for the radio frequency front-end of claim 1 further comprising a first single pole switch having a first throw coupled to the first SAW band pass transmit filter, a second throw coupled to the second SAW band pass transmit filter, and a third throw coupled to the third SAW band pass filter.

4. The architecture for the radio frequency front-end of claim 1 further comprising:
a first SAW band pass receive filter with a fourth bandwidth corresponding to a first receive band;
a second SAW band pass receive filter with a fifth bandwidth corresponding to a first receive sub-band of a second receive band; and
a third SAW band pass receive filter with a sixth bandwidth corresponding to a second receive sub-band of the second receive band, wherein the first receive sub-band is adjacent to the second receive sub-band and the fourth bandwidth is equal to a summation of the fifth bandwidth and the sixth bandwidth.

5. The architecture for the radio frequency front-end of claim 4 wherein the fifth bandwidth is equal to the sixth bandwidth.

6. The architecture for the radio frequency front-end of claim 4 further including a first double pole switch having a first double throw coupled to the second SAW band pass receive filter and a second double throw coupled to the third SAW band pass receive filter.

7. The architecture for the radio frequency front-end of claim 4 wherein the first SAW band pass transmit filter, the second SAW band pass transmit filter, and the third SAW band pass transmit filter comprise a first transmit filter bank on a first die, and the first SAW band pass receive filter, the second SAW band pass receive filter, and the third SAW band pass receive filter comprise a first receive filter bank on a second die.

8. The architecture for the radio frequency front-end of claim 7 wherein the first die and the second die are integrated into a first circuit module.

9. The architecture for the radio frequency front-end of claim 1 wherein the eighth bandwidth is equal to the ninth bandwidth.

10. The architecture for the radio frequency front-end of claim 1 further comprising a second single pole switch having a fourth throw coupled to the fourth SAW band pass transmit filter, a fifth throw coupled to the fifth SAW band pass transmit filter, and a sixth throw coupled to the sixth SAW band pass filter.

11. The architecture for the radio frequency front-end of claim 1 further comprising:
a fourth SAW band pass receive filter with a tenth bandwidth corresponding to a third receive band;
a fifth SAW band pass receive filter with an eleventh bandwidth corresponding to a third receive sub-band of a fourth receive band; and
a sixth SAW band pass receive filter with a twelfth bandwidth corresponding to a fourth receive sub-band of the fourth receive band, wherein the third receive sub-band is adjacent to the fourth receive sub-band and 1.4 times the tenth bandwidth is equal to a summation of the eleventh bandwidth and the twelfth bandwidth.

12. The architecture for the radio frequency front-end of claim 11 wherein the eleventh bandwidth is equal to the twelfth bandwidth.

13. The architecture for the radio frequency front-end of claim 11 further including a second double pole switch having a first double throw coupled to the first SAW band pass receive filter and a second double throw coupled to the second SAW band pass receive filter.

14. The architecture for the radio frequency front-end of claim 11 wherein the fourth SAW band pass transmit filter, the fifth SAW band pass transmit filter, and the sixth SAW band pass transmit filter comprise a second transmit filter bank on a third die, and the fourth SAW band pass receive filter, the fifth SAW band pass receive filter, and the sixth SAW band pass receive filter comprise a second receive filter bank on a fourth die.

15. The architecture for the radio frequency front-end of claim 14 wherein the third die and the fourth die are integrated into a second circuit module.

16. The architecture for the radio frequency front-end of claim 11 further including an antenna switch coupled to outputs of the first transmit filter bank, inputs of the first receive filter bank, outputs of the second transmit filter bank, and inputs of the second receive filter bank.

17. Architecture for a radio frequency front-end comprising:
a first module comprising:
a first die having a first transmit filter bank comprising a first SAW band pass transmit filter with a first bandwidth corresponding to a first transmit band, a second SAW band pass transmit filter with a second bandwidth corresponding to a first transmit sub-band of a second transmit band, and a third SAW band pass transmit filter having a third bandwidth corresponding to a second transmit sub-band of the second transmit band, wherein the first transmit sub-band is adjacent to the second transmit sub-band and the first bandwidth is equal to a summation of the second bandwidth and the third bandwidth;
a second die having a first receive filter bank comprising a first SAW band pass receive filter with a fourth bandwidth corresponding to a first receive band, a second SAW band pass receive filter with a fifth bandwidth corresponding to a first receive sub-band of a second receive band, and a third SAW band pass receive filter having a sixth bandwidth corresponding to a second receive sub-band of the second receive band, wherein the first receive sub-band is adjacent to the second receive sub-band band and the fourth bandwidth is equal to a summation of the fifth bandwidth and the sixth bandwidth; and
a second module comprising:
a third die having a second transmit filter bank comprising a fourth SAW band pass transmit filter with a seventh bandwidth associated with a third transmit band, a fifth SAW band pass transmit filter with a eighth bandwidth corresponding to a third transmit sub-band of a fourth transmit band, and a sixth SAW band pass transmit filter having a ninth bandwidth corresponding to a fourth transmit sub-band of the fourth transmit band, wherein the third transmit sub-band is adjacent to the fourth transmit sub-band and 1.4 times the seventh bandwidth is equal to a summation of the eighth bandwidth and the ninth bandwidth; and a fourth die having a second receive filter bank comprising a first SAW band pass receive filter with a tenth bandwidth associated with a third receive band, a second SAW band pass receive filter with an eleventh bandwidth corresponding to a third receive sub-band of a fourth receive band, and a third SAW band pass receive filter having a twelfth bandwidth corresponding to a fourth receive sub-band of the fourth receive band, wherein the third receive sub-band is adjacent to the fourth receive sub-band and 1.4 times the tenth bandwidth is equal to a summation of the eleventh bandwidth and the twelfth bandwidth.

18. The architecture for the radio frequency front-end of claim 17 further comprising:

a first single pole switch having a first throw coupled to the first SAW band pass transmit filter, a second throw coupled to the second SAW band pass transmit filter, and a third throw coupled to the third SAW band pass filter;

a first double pole switch having a first double throw coupled to the second SAW band pass receive filter and a second double throw coupled to the third SAW band pass receive filter;

a second single pole switch having a fourth throw coupled to the fourth SAW band pass transmit filter, a fifth throw coupled to the fifth SAW band pass transmit filter, and a sixth throw coupled to the sixth SAW band pass transmit filter; and a second double pole switch having a third double throw coupled to the first SAW band pass receive filter and a fourth double throw coupled to the third SAW band pass receive filter.

19. The architecture for the radio frequency front-end of claim 18 further including a control system adapted to control opening and closing of the first single pole switch, the second single pole switch, the first double pole switch, and the second double pole switch.

20. The architecture for the radio frequency front-end of claim 19 further including an antenna switch coupled to outputs of the first transmit filter bank, inputs of the first receive filter bank, outputs of the second transmit filter bank, and inputs of the second receive filter bank.

21. The architecture for the radio frequency front-end of claim 20 further including an RF front-end (RFFE) interface communicatively coupled between the control system and the antenna switch.

22. The architecture for the radio frequency front-end of claim 20 further including at least one harmonic filter coupled between a power amplifier and the antenna switch.

* * * * *